(12) United States Patent
Kim

(10) Patent No.: US 7,269,655 B2
(45) Date of Patent: Sep. 11, 2007

(54) METHOD AND SYSTEM FOR PROVIDING AN INSTANT MESSAGING SERVICE IN A MOBILE COMMUNICATION NETWORK

(75) Inventor: Duk-Soo Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 475 days.

(21) Appl. No.: 10/778,153

(22) Filed: Feb. 17, 2004

(65) Prior Publication Data
US 2004/0248600 A1    Dec. 9, 2004

(30) Foreign Application Priority Data
Feb. 15, 2003    (KR) ............... 10-2003-0009646

(51) Int. Cl.
*G06F 13/00*    (2006.01)
(52) U.S. Cl. ............ 709/228; 709/219; 709/225; 709/249
(58) Field of Classification Search ........ 709/205, 709/206, 219, 227, 228, 237
See application file for complete search history.

(56) References Cited

U.S. PATENT DOCUMENTS 7,062,253 B2 * 6/2006 Money et al. ............ 455/406
2002/0126701 A1 * 9/2002 Requena ............ 370/469
2002/0131395 A1 * 9/2002 Wang ............ 370/349
2003/0065729 A1 * 4/2003 Leinonen ............ 709/206
2004/0037406 A1 * 2/2004 Gourraud ............ 379/202.01

* cited by examiner

*Primary Examiner*—Viet D. Vu
(74) *Attorney, Agent, or Firm*—Roylance, Abrams, Berdo & Goodman, L.L.P.

(57) ABSTRACT

A system and method for providing an instant messaging (IM) service via a Code Division Multiple Access (CDMA) mobile network is provided. A Session Initiation Protocol (SIP) server is connected to the mobile network and an instant messaging service (IM) server via the Internet. The SIP server performs a proxy function for the mobile network allowing the mobile terminal connected to the Internet via the network to receive an instant messaging service from the IM server. The SIP server relays a SIP message, including an instruction word, an instant message or a processed result for an instant messaging service, between the IM server and the terminal. An additional call control according to the Internet protocol in a system is performed, which makes it possible for a user connected to the Internet via the mobile network to communicate instant messages with selected buddies or colleagues.

19 Claims, 9 Drawing Sheets

```
generic-message =   start-line
                    *message-header
                    CRLF
                    [ message-body ]
start-line      =   Request-Line / Status-Line
message-body    =
   [FUNCTION] : [ACT] [CAT] [UID] [TID] [DATA] [RESULT]
```

FIG.3

METHOD AND SYSTEM FOR PROVIDING AN INSTANT MESSAGING SERVICE IN A MOBILE COMMUNICATION NETWORK

PRIORITY

This application claims priority to an application entitled "METHOD AND SYSTEM FOR PROVIDING INSTANT MESSAGING SERVICE THROUGH MOBILE COMMUNICATION NETWORK", filed in the Korean Intellectual Property Office on Feb. 15, 2003 and assigned Serial No. 2003-9646, the contents of which are incorporated herein by reference.

BACKGROUND OF THE INVENTION

1. Field of the Invention

The present invention relates to a mobile communication system, and more particularly to a method for providing an instant messaging service in a Code Division Multiple Access (CDMA) mobile communication network.

2. Description of the Related Art

Generally, wireless communication systems, such as a Code Division Multiple Access (CDMA) 2000 1x, a Wideband Code Division Multiple Access/Universal Mobile Telecommunications System (WCDMA/UMTS), a General Packet Radio System (GPRS) and a CDMA 2000 Evolution in Data Only (1xEV DO), 1xEV-DV, perform 3rd-generation wireless communication. In particular, the CDMA 2000 1xEV-DO, 1xEV-DV system is a data only system optimized for high-speed packet data services. In a communication system such as 1xEV-DO, 1xEV-DV which is capable of transmitting high volume data, research is in progress for application of various services, which have previously been available only over the Internet, to mobile communication systems.

As the Internet comes into wide use and computer usage increases in daily life, most Internet users prefer to use instant messaging services, such as Microsoft Network (MSN), Internet Relay Chat (IRC) and I Seek You (ICQ), rather than use conventional emails to communicate with their colleagues or buddies.

Instant messaging services (called "IM" for short) allow users to easily know whether their colleagues or buddies are connected to the Internet, and also to communicate with them if they are connected. The instant messaging service also permits instant exchange of messages, which is different from emails, and also makes continual message exchanges easier than the email transmission. For instant messaging, most message exchanges are text-based, but file attachment is also possible depending on the kind of service.

However, the instant messaging service is currently not available for moving users but rather can only be provided to stationary or notebook computers connected to the Internet. In other words, users connected to the Internet through the mobile communication network cannot receive the instant messaging service since the mobile communication system does not support the instant messaging service. Thus, there is a need to provide a method and mechanism for providing instant messaging services using an EV-DO terminal capable of connecting to the Internet.

SUMMARY OF THE INVENTION

Therefore, the present invention has been made in view of the above problem, and it is an object of the present invention to provide a method and system for providing an instant messaging service via a mobile communication system.

It is another object of the present invention to provide a method and system for providing an instant messaging service wherein a mobile communication system is connected to a service server on the Internet to perform message processing between a mobile terminal and the service server to provide the instant messaging service.

In accordance with one aspect of the present invention, the above and other objects can be accomplished by the provision of a method for providing an instant messaging service to a mobile terminal connected to the Internet via a mobile communication network, the method comprising the steps of a) providing a Session Initiation Protocol (SIP) server connected to a mobile communication network and an instant messaging service (IM) server via the Internet, said SIP server performing a proxy function of the mobile communication network allowing a mobile terminal connected to the Internet via the mobile communication network to receive an instant messaging service from the IM server; and b), relaying an SIP message including information for an instant messaging service between the IM server and the mobile terminal.

In accordance with another aspect of the present invention, there is provided a system for providing an instant messaging service to a mobile terminal connected to the Internet via a mobile communication network, said system comprising an Instant Messaging (IM) server connected to the Internet for providing an instant messaging service; and a Session Initiation Protocol (SIP) server, connected to a mobile communication network and the IM server via the Internet, for performing a proxy function of the mobile communication network so that a mobile terminal connected to the Internet via the mobile communication network can receive an instant messaging service from the IM server, said SIP server relaying an SIP message, including at least one of an instruction word, a message for transmission and a processed result for an instant messaging service, between the IM server and the mobile terminal.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a diagram illustrating a format of a Session Initiation Protocol (SIP) message according to an embodiment of the present invention;

DETAILED DESCRIPTION OF THE PREFERRED EMBODIMENTS

Embodiments of the present invention will be described in detail with reference to the accompanying drawings. In the following description, a detailed description of known functions and configurations incorporated herein will be omitted for conciseness. Also, the terms used in the following description are terms defined by taking into consideration the functions obtained in accordance with the embodiments of the present invention. Thus, the definitions of these terms should be determined based on the whole content of this specification because the terms may be changed in accordance with the option of a user or operator or a usual practice.

As will be described below, the embodiments of the present invention relate to an instant messaging service applied to a mobile communication system, in which a terminal capable of connecting to an instant messaging network in mobile communication environments transmits a message to a selected message recipient or members of a selected message recipient group. The instant message network may be regarded as the Internet.

A message that a user produces with his or her terminal is transmitted to a Session Initiation Protocol (SIP) server via a mobile communication network. As a server implementing a proxy function of the mobile communication network on the Internet, the SIP server transfers information of the message received from the terminal to an instant messaging (IM) service server (or an IM server). The IM server checks the subscriber information of the terminal from which the message is transmitted, and transfers the message only to a recipient currently connected to the Internet (i.e., an online recipient) from among recipients to whom the user desires to transmit the message.

The embodiment of the present invention provides instant messaging services over the Internet to users via terminals capable of supporting the Internet protocol in voice environments in a synchronous Code Division Multiple Access (CDMA) 1xEV-DO, 1xEV-DV system. To accomplish this, the embodiment of the present invention employs a SIP of Request For Comments (RFC) 3261 as a standard protocol of the Internet Engineering Task Force (IETF), and adds a function to implement instant message processing to a Session Description Protocol (SDP) of RFC 2327 that is a content part of the SIP.

To illustrate the features of the embodiment of the present invention, a communication scheme used for interworking between an EV-DO terminal, a SIP server and an IM server will be described.

Figure 1:
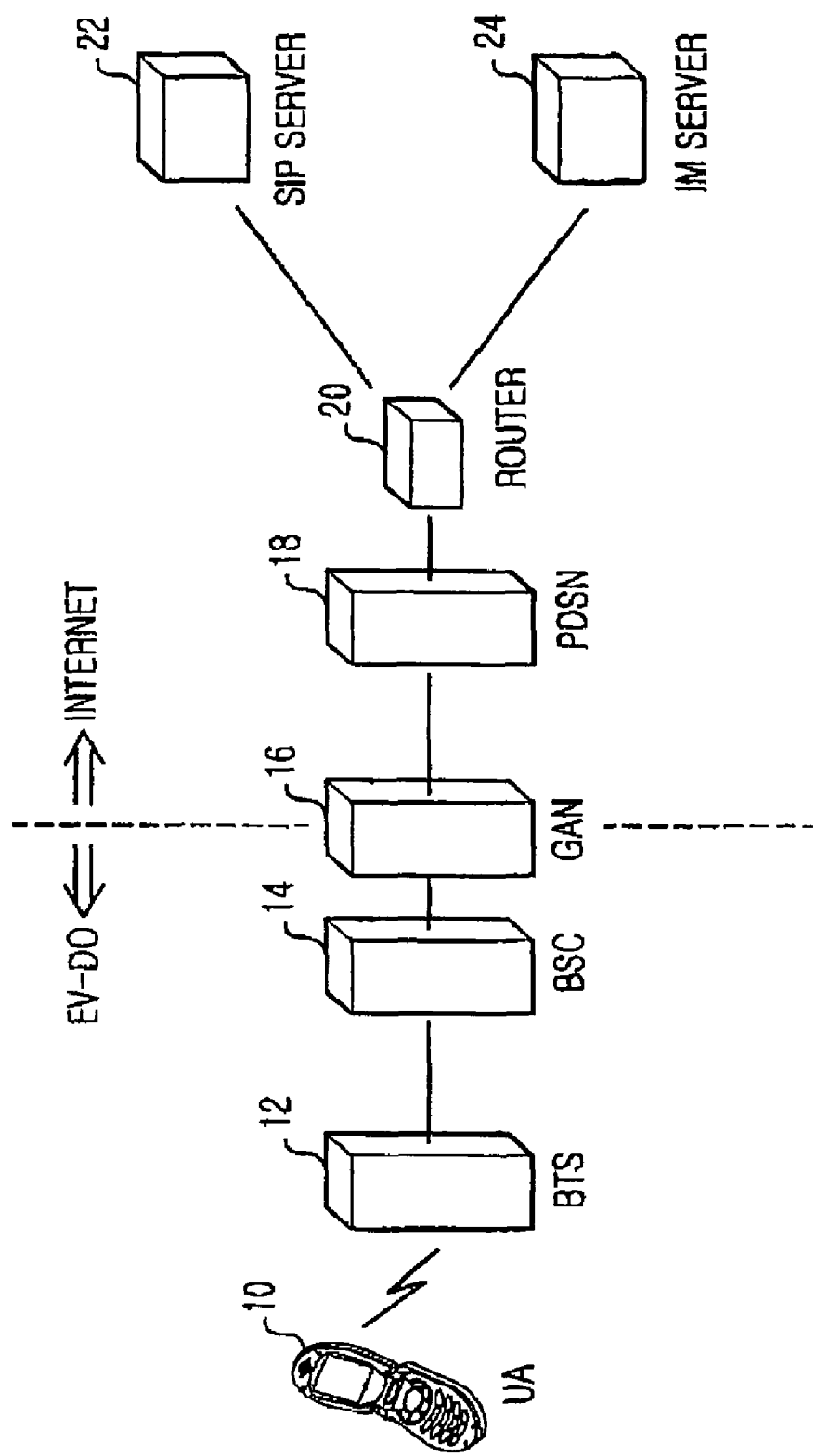
FIG. 1 is a block diagram illustrating a network structure for providing an instant messaging service to an terminal according to an embodiment of the present invention.
Figure 2:
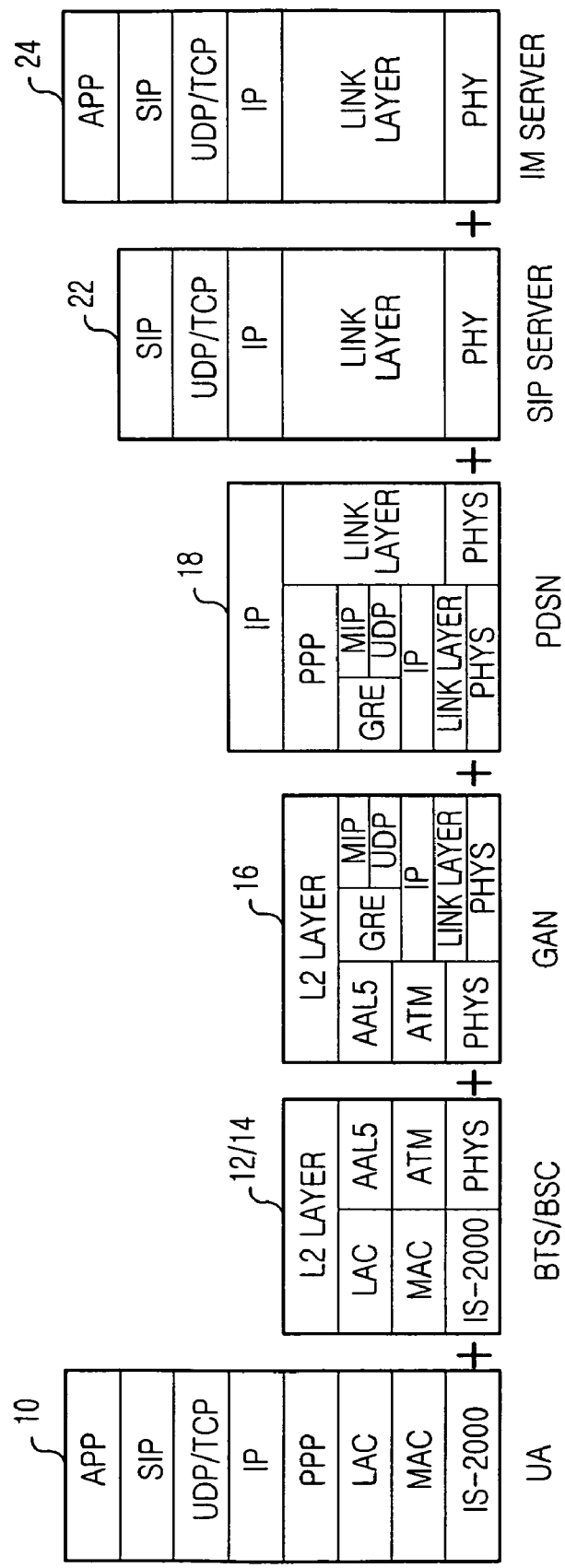
FIG. 2 is a block diagram illustrating a protocol stack of the Open systems Interconnection (OSI) reference model used with the network structure of FIG. 1.

FIG. 1 is a block diagram illustrating a network structure for providing an instant messaging service to an terminal according to an embodiment of the present invention, and FIG. 2 is a block diagram illustrating a protocol stack of the Open systems Interconnection (OSI) reference model used with the network structure of FIG. 1.

In FIG. 1, an terminal, User Agent (UA) 10 is connected to the Internet via a system to receive an instant message. The terminal is capable of supporting the Internet protocol (IP) in voice environments, and is loaded with an application program for interworking with an IM server 24 that includes an SIP stack (not shown) and provides the instant messaging service.

A Base Transceiver Subsystem (BTS) 12 of the system is connected to the terminal 10 over a wireless channel, and exchanges wireless messages according to the standard. A Base Station Controller (BSC) 14 controls connections to the BTS 12.

A Global ATM Network (GAN) 16 connected to the BSC 14 is a gateway whereby a system with an Asynchronous Transfer Mode (ATM) backbone is connected to the Internet. A Packet Data Service Node (PDSN) 18 connected to the GAN 16, controls Internet access to the terminal 10 via a mobile communication system, and accesses various Internet service servers, such as an SIP server 22 and the IM server 24, via a router 20.

As a service server for providing instant messaging services (for example Microsoft Network (MSN), Internet Relay Chat (IRC), and I Seek You (ICQ)), the IM server 24 detects registered or subscribed users via user IDs. The IM server 24 manages the respective states, receiving modes, message recipient lists, and subscriber configuration information of the registered users, and transfers messages between users currently connected to the Internet (i.e., online users). In particular, the IM server 24 according to the embodiment of the present invention provides an instant messaging service to a user of the terminal 10 who accesses the instant messaging service via the SIP server 22.

The SIP server 22 relays SIP messages including an instruction word or a transmission text (or a transmission message) between the terminal 10 and the IM server 24. Accordingly, the user can connect wirelessly to the Internet via the terminal 10 that is nonstationary, and check whether selected colleagues or buddies are online, and then transmit instant messages to them if they are online.

The terminal 10 includes a physical layer, a Media Access Control (MAC) layer and a Link Access Control (LAC) layer of the IS-2000 standard, and supports A SIP and a User Datagram Protocol/Transmission Control Protocol (UDP/TCP) based on the Point to Point Protocol (PPP) and the IP. In particular, the terminal 10 is loaded with an application program for handling an instant messaging service according to the SIP.

The BTS 12 includes a physical layer, a MAC layer and a LAC layer using the IS-2000 standard, which is incorporated herein by reference. The BSC 14 includes a physical layer, an ATM layer and an Adaptation ATM Layer type 5 (AAL5) layer that support connections via a trunk.

The GAN 16 includes a physical layer, an ATM layer and an AAL5 layer for connection to the system, and a physical layer and a link layer for connection to the Internet, which supports a UDP, a Mobile IP (MIP), and Generic Routing Encapsulation (GRE) encapsulation based on the IP.

The PDSN 18 includes a physical layer and a link layer for connection with the GAN 16, and includes a physical layer and a link layer for communication with servers on the Internet and supporting a UDP, a MIP, PPP connection and GRE encapsulation based on the IP.

The SIP server 22 and the IM server 24 each include a physical layer and a link layer, and support a UDP and an SIP based on the IP. In particular, the IM server 24 is loaded with an application program for providing an instant messaging service based on the SIP.

The SIP in the protocol stack shown in FIG. 2, which is used to provide the instant messaging service, can check whether communication is possible, and establish, modify and terminate multimedia sessions or Internet telephony calls, and also invite participants to unicast or multicast sessions. The SIP is a request-response protocol capable of dealing with requests from clients and responses from servers. Participants are identified by SIP Uniform Resource Locator (URLs).

According to the connection structure as shown in FIG. 2, if the SIP is used for the instant messaging service, the terminal 10 serves as a client and the IM server 24 serves as a server, and the SIP server 22 performs a proxy function between the terminal 10 and the IM server 24. The format of an SIP message used for the instant messaging service in the mobile communication system will now be described with reference to the RFC 3261 of IETF.

FIG. 3 is a diagram illustrating the format of a SIP message according to an embodiment of the present invention. The SIP message is either a request from a client to a server or a response from a server to a client. Both the request and response messages use a generic message format shown in FIG. 3. The SIP message could be divided in two types. The request message is a SIP request message and the response message is a SIP response message.

As shown in FIG. 3, the SIP message includes a start-line, one or more header fields, an empty-line indicating the end of the header field and an optional message-body.

The start-line, each message header line and the empty-line are terminated by a Carriage-Return Line-Feed (CRLF) sequence, and the empty-line exists even if the message-body does not exist. The start-line includes a request-line containing request content such as, for example, "INVITE carol@chicago.com SIP/2.0", or a status-line containing response information such as, for example, "SIP/2.0 200 OK". Functions that may be contained in the request-line include not only INVITE but also REGISTER, SUBSCRIBE, NOTIFY, MESSAGE and the like.

In the embodiment of the present invention, the SIP message is generated in a server or client according to a requesting type. The requesting type is one of User login/logout, User status request, receiving mode change request, recipient information request, message transmission, change of subscriber information. The content of a SIP message according to the IM service, inserted into the message-body of the SIP message, includes a function field "[FUNCTION]", an action field "[ACT]", a category field "[CAT]", a user identification field "[UID]", a target user identification field "[TID]", a data field "[DATA]" and a result field "[RESULT]".

The function field indicates the function of a message to be sent, and can indicate 6 functions: LOG, STATUS, MODE, MANAGEMENT, MESSAGE and PROFILE. The mode function is used for a user to set his or her receiving mode. The receiving mode may be set to either reception of person-to-person messages or reception of group messages.

The action field is a description for detecting operations of a function indicated by the function field, which is assigned "ON" (log-in), "OFF" (log-out), "ADD", "DEL" (delete), "CREATE", "UPDATE" or the like. The category field is a description for specifying a range in which the operation of a function indicated by the function field is performed. The category field is assigned "ONE" (one user), "GROUP", "NICKNAME", "PASSWORD", "STATUS" or the like, depending on a function to be performed.

The user identification field includes a domain name for indicating a sender who sends a message. The target user identification field includes a domain name for indicating a target user who receives a message or is affected thereby. The target user identification field may not exist depending on the functions. The data field is a part of the SIP message through which data according to a function indicated by the function field is sent, and includes data such as a password in the case of login, a message (for example, an instant message "hello") in the case of message transmission, and error information in the case of error occurrence. The result field is used only in the response message, which indicates the result of a request, and has a value of "OK" when the result is successful and "FAIL" when unsuccessful.

When a request for the instant messaging service is received via a mobile communication network, the SIP server transfers a corresponding SIP message containing the requested content to the IM server.

The following is an example of the message-body of a SIP message for the instant messaging service, which is expressed in eXtensible Markup Language (XML).

```
MESSAGE:    CAT=ONE,    UID=tiger@samsung.com,
TID=lion@samsung.com, DATA=Hello;
   <MESSAGE>
   <CAT>ONE</CAT>
   <UID>tiger@samsung.com</UID>
   <TID>lion@samsung.com</TID>
   <DATA>Hello</DATA>
   </MESSAGE>
```

This example is a message-body when a sender "tiger@samsung.com" sends an instant message "Hello" to a target "lion@samsung.com".

The basic scenarios for providing the instant messaging service may be classified into user login/logout, user status request, receiving mode change, recipient information management, message transmission, and subscriber information change. Message formats for the basic scenarios will now be described.

1. Message Format for User Login/Logout Scenario

The following is an example of a request message transmitted from a client to a server on login.

LOG:    ACT=ON,    UID=tiger@samsung.com, DATA=*****

In the case of login (ACT=ON), the data field is a user's password composed of 10 or less characters (letters or numbers). The following is an example of a response message transmitted from the server to the client if the server succeeds in performing user authentication in response to the login request.

LOG: RESULT=OK, UID=tiger@samsung.com(angel);

Here, the user identification includes a nickname ("angel" in this example) determined by the user.

If the server fails to perform user authentication, the response message is as follows.

LOG: RESULT=FAIL, DATA=The ID does not exist;

The following is an example of a request message transmitted from the client to the server on logout.

LOG: ACT=OFF, UID=tiger@samsung.com;

The following is an example of a response message transmitted from the server to the client in response to the logout request message.

LOG: RESULT=OK;

2. Message Format for User Status Request Scenario

There are various kinds of user states for the instant messaging service as follows.

ON: online
OFF: offline
ABS_MEAL: eating
ABS_MEET: meeting

ABS_OUT: out

ABS_WORK: at work

ABS_ETC: away, etc.

The following is an example of a request message transmitted from a client to a server in order to request the status of a specific user.

STATUS: CAT=ONE, UID=tiger@samsung.com, DATA=lion@imptt.com;

The category field is set to "ONE" since the status of one user is requested in the example, and the data field includes the ID of a target user whose status is to be requested.

The following are examples of a response message transmitted from the server to the client in response to the status request.

STATUS: RESULT=OK, CAT=ONE, DATA=tiger@imptt.com:ON;

STATUS: RESULT=FAIL, CAT=ONE, DATA=The ID does not exist;

STATUS: RESULT=FAIL, CAT=ONE, DATA=You must first login;

In order for a user to perform all requests including the status request, the user must first log in.

3. Message Format for Receiving Mode Change Scenario

The receiving mode change allows a user to block messages received from the outside. The following is an example of a request message transmitted from a client to a server in order to change the receiving mode.

MODE: UID=tiger@samsung.com, DATA=01;

In the case of a receiving mode change, the data field is set to a value indicating a desired receiving mode. In the data field, the first digit represents a person-to-person message, and the second digit represents a group message. A value "1" indicates that reception is allowed, and a value "0" indicates that reception is not allowed. When the user logs in, the receiving mode is set to "11", which indicates that the reception of both person-to-person messages and group messages is allowed. If the receiving mode is set to "01", it indicates that the reception of person-to-person messages is not allowed, but the reception of group messages is allowed.

The following are examples of a response message transmitted from a server to a client in response to a receiving mode change request.

MODE: RESULT=OK;

MODE: RESULT=FAIL, DATA=You must first login;

The user can change the receiving mode only when logged in.

4. Message Format for Recipient Information Management

The following is an example of a request message transmitted from a client to a server in order to add a new recipient to a message recipient list of a user.

MANAGEMENT: ACT=ADD, CAT=ONE, UID=tiger@imptt.com, DATA=lion@imptt.com;

In the case of adding (ACT=ADD) a user (CAT=ONE), the data field includes the user ID of a recipient to be added, where one request message includes only one user ID.

The following is an example of a response message that the server transmits to the client in response to the recipient addition request.

MANAGEMENT: RESULT=OK, DATA=lion@imptt.com(angel);

As can be seen from this example, if the recipient addition result is successful (OK), the data field of the response message includes a nickname registered in relation to the added recipient. The following is an example of the response message when the recipient addition result is unsuccessful (FAIL).

MANAGEMENT: RESULT=FAIL, DATA=The ID does not exist;

Only subscribers of the instant messaging service can be registered in the message recipient list.

The following is an example of a request message transmitted from the client to the server in order to delete a recipient registered in the message recipient list of the user (corresponding to the client).

MANAGEMENT: ACT=DEL, CAT=ONE, UID=tiger@imptt.com, DATA=lion@imptt.com

The following are examples of a response message that the server transmits to the client in response to the recipient deletion request.

MANAGEMENT: RESULT=OK;

MANAGEMENT: RESULT=FAIL, DATA=The ID does not exist;

Recipients registered in the message recipient list can be classified into message recipient groups according to the user's preferences. The following is an example of a request message transmitted from the client to the server in order to create a new message recipient group.

MANAGEMENT: ACT=CREATE, CAT=GROUP, UID=tiger@imptt.com, DATA=schoolmate;

Here, when creating (ACT=CREATE) a group (CAT=GROUP), the data field includes the name of a group to be added, and the group name is unique for the same user.

The following are examples of a response message transmitted from the server to the client in response to the group creation request.

MANAGEMENT: RESULT=OK;

MANAGEMENT: RESULT=FAIL, DATA=The group name already exist;

One user cannot produce a plurality of groups having the same name.

The following is an example of a request message transmitted from the client to the server in order to delete a created group.

MANAGEMENT: ACT=del, CAT=GROUP, UID=tiger@imptt.com, DATA=schoolmate;

The following are examples of a response message transmitted from the server to the client in response to the group deletion request.

MANAGEMENT: RESULT=OK;

MANAGEMENT: RESULT=FAIL, DATA=The group name does not exist;

The following is an example of a request message transmitted from the client to the server in order to update the name of a created group.

MANAGEMENT: ACT=update, CAT=GROUP, UID=tiger@imptt.com, TID=schoolmate, DATA=classmate;

In the case of updating (ACT=UPDATE) the name of a group (CAT=GROUP), the target user identification field (TID) includes the previous name of the group, and the data field includes a new group name. Thus, only one group name can be updated with one request message.

The following are examples of a response message transmitted from the server to the client in response to the group name update request.

MANAGEMENT: RESULT=OK;

MANAGEMENT: RESULT=FAIL, DATA=The GROUP name does not exist;

The following is an example of a request message transmitted from the client to the server in order to add a new recipient to a created group.

MANAGEMENT: ACT=add, CAT=ONE, UID=tiger@imptt.com, TID=schoolmate, DATA=pig@imptt.com;

Here, in the case of adding (ACT=ADD) a user or recipient (CAT=ONE) to a specific group, the request message further includes a target user identification (TID) field that contains the name of the specific group to which the recipient is to be added. If the request message includes no TID field, the added recipient is not included in any group. The ID of the recipient to be added is included in the data field.

The following are examples of a response message transmitted from the server to the client in response to a request that a recipient be added to a message recipient group.

MANAGEMENT: RESULT=OK,
MANAGEMENT: RESULT=FAIL, DATA=The group name does not exist;

The following is an example of a request message transmitted from the client to the server in order to delete a recipient from a created group.

MANAGEMENT: ACT=DEL, CAT=ONE, UID=tiger@imptt.com, TID=schoolmate, DATA=pig@imptt.com;

In the case of deleting (ACT=DEL) a user or recipient (CAT=ONE) from a specific group, the request message further includes a target user identification (TID) field that contains the name of the specific group from which the recipient is to be deleted. If the request message includes no TID field, the user ID included in the data field is deleted from the message recipient list.

The following are examples of a response message transmitted from the server to the client in response to a request that a recipient be deleted from a group.

MANAGEMENT: RESULT=OK;
MANAGEMENT: RESULT=FAIL, DATA=The user ID you want to delete does not exist;

5. Message Format for Message Transmission

The MESSAGE function is used to transmit text data to one user or to a number of different users. The following is an example of a request message transmitted from a transmitting client to a server in order for a user to transmit text data to another user.

MESSAGE: CAT=ONE, UID=tiger@samsung.com, TID=lion@imptt.com, DATA=hello;

In the case of transmitting a message to a selected user (CAT=ONE), the user identification (UID) field includes the ID of a sender, and the target user identification (TID) field includes the ID of the selected user. In this example, tiger@samsung.com sends a message "hello" to lion@imptt.com.

The following is an example of a response message that the server transmits to a receiving client in response to the message transmission request.

MESSAGE: UID=tiger@samsung.com(angel), TID=lion@imptt.com, DATA=hello;

In the case of transferring a message from a sender to a recipient, the UID field includes the ID of the sender, together with a registered nickname of the sender. In this example, a message "hello" from tiger@samsung.com is transferred to lion@imptt.com. If a message for transmission is successfully transmitted to the recipient, no response message is transmitted to the sender.

In case the message transmission fails, the server transmits the following response message to the transmitting client.

MESSAGE: RESULT=FAIL, DATA=The state of target user is not available for receive message;

In this example, the server cannot check the status of the recipient or the recipient denies reception of the message.

The following is an example of a request message transmitted from a transmitting client to the server in order for a corresponding user to transmit text data to other users of a registered group.

MESSAGE: CAT=GROUP, UID=tiger@samsung.com, TID=schoolmate, DATA=hello;

In the case where a message is transmitted to a selected group's users, the UID field includes the sender's ID and the TID field includes the selected group's name. In this example, tiger@samsung.com transmits a message "hello" to recipients of a group named "schoolmate".

The server retrieves a message recipient list registered for a user who has requested the group message transmission, and confirms online recipients from among recipients belonging to the requested group, and then simultaneously transmits the requested message to the online recipients. The following is an example of a response message that the server transmits to the receiving clients in response to the group message transmission request.

MESSAGE: UID=tiger@samsung.com(angel), TID=lion@imptt.com, pig@imptt.com, rabbit@samsung.com, DATA=hello;

Similarly, the sender's ID, together with the sender's registered nickname, is transmitted to the recipients. In this example, a message "hello" from tiger@samsung.com is transferred to users or recipients (lion@imptt.com, pig@imptt.com and rabbit@samsung.com) registered in the group named "schoolmate".

The server does not transmit the message to users, who do not permit group message reception, from among the recipients. In this case, the result field is set to "OK" (i.e., RESULT=OK), and the users, who do not permit group message reception, are marked in the data field. Even if all the users do not permit group message reception, the result field is set to "OK".

In the case where the message transmission fails since it is impossible to confirm the requested group, the server transmits the following response message to the transmitting client.

MESSAGE: RESULT=FAIL, DATA=The group does not exist;

6. Message Format for Change of Subscriber Information

A user uses a PROFILE function to change the user's instant messaging profile or service environment. The following is an example of a request message transmitted from a client (corresponding to the user) to a server in order to change the user's screen name (or nickname) that is seen by other users, who registered the user as their recipient, after the user's login.

PROFILE: CAT=NICKNAME, UID=tiger@samsung.com, DATA=Angel;

In the case where a user wishes to change a nickname in the profile, the user identification (UID) field includes the ID of the user who desires to change his or her nickname, and the data field includes a new nickname with which the user wishes to replace the existing nickname. The server retrieves subscriber information of the user, and replaces the existing nickname with the requested new nickname. The following is an example of a response message transmitted from the server to the client when the nickname is successfully changed.

PROFILE: RESULT=OK;

If the user's nickname is longer than the maximum length (for example 24 letters) supportable by the service server, the server transmits the following response message to the client in order to inform the user of failed nickname change.

PROFILE: RESULT=FAIL, DATA=The nick name must not exceed to 24 characters;

The following is an example of a request message transmitted from the client to the server in order to change a password used for login.

PROFILE: CAT=PASSWORD, UID=tiger@samsung.com, DATA=********;

Here, the data field includes a new password with which the user desires to replace the existing password. The server retrieves subscriber information of the user, and replaces the existing password with the requested new password. The following are examples of a response message the server transmits to the client in response to the password change request.

PROFILE: RESULT=OK;
PROFILE: RESULT=FAIL, DATA=The new password must be different with before password The following is an example of a request message transmitted from the client to the server in order to change the user's status that is seen by recipients online when the user logs in.

PROFILE: CAT=STATE, UID=tiger@samsung.com, DATA=ABS_MEAL;

Here, the data field represents the user's status with which the user wishes to replace the existing status. The server retrieves subscriber information of the user, and replaces the existing status with the requested new status. The following is an example of a response message that the server transmits to the client in response to the status change request.

PROFILE: RESULT=OK;

The operation according to the present invention based on the SIP message format described above will now be described with reference to the drawings. A terminal communicates with a mobile communication network over a wireless channel according to the standard, and an SIP server as a proxy of the terminal communicates with an IM server. A term "method" in the following description refers to an SIP method defined in the IETE RFC 3261 (Session Initiation Protocol), and each method is transmitted while being contained in a corresponding message.

Figure 4:
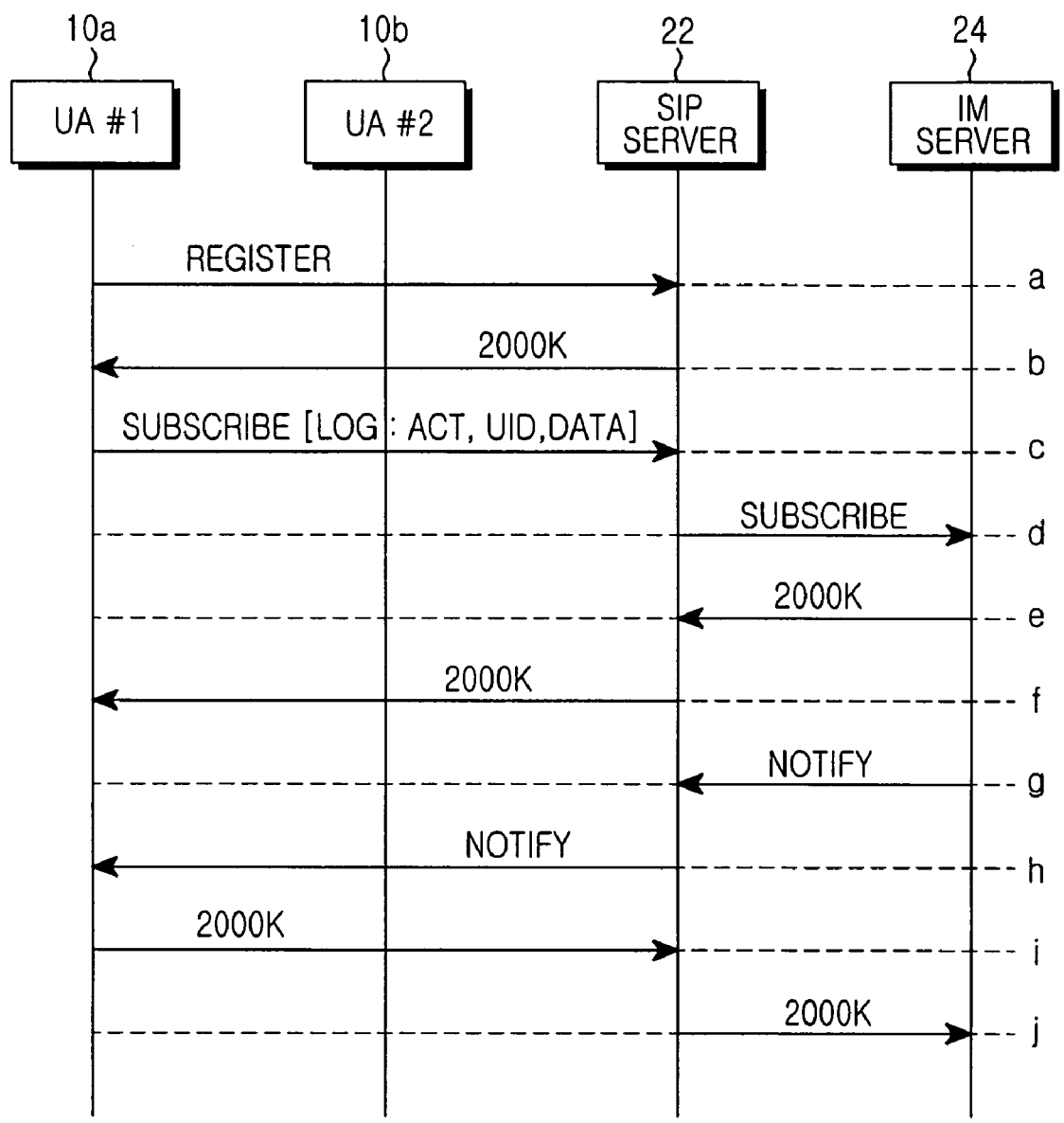
FIG. 4 is a message flow diagram illustrating a login operation in an instant messaging service according to an embodiment of the present invention.

FIG. 4 is a message flow diagram illustrating a login operation in an instant messaging service according to an embodiment of the present invention.

As shown in this figure, an terminal (UA#1) 10a is connected to the Internet via a mobile communication network at step a). Next, in order to join the instant messaging service, the terminal 10a transmits an SIP message (hereinafter, referred to as a "REGISTER message"), which contains request content "REGISTER" in its start-line, to an SIP server 22 that performs a proxy function of the mobile communication network. At step b), the SIP server 22 verifies that the terminal 10a is a subscriber of the mobile communication network, and registers subscriber information of the terminal 10a in a registrar database. Then, the SIP server 22 notifies the terminal 10a of the result via an SIP message (hereinafter, referred to as a "200 OK message") that contains status information "200 OK" in its status-line.

At step c), in order to receive the instant messaging service, the terminal 10a transmits an SIP message, which contains an SIP method "SUBSCRIBE" in its start-line to the SIP server 22. The SUBSCRIBE message contains a user identification (i.e., a URL and a password) that the user inputs as login information.

At step d), the SIP server 22 notifies an IM server 24 of the login information received from the terminal 10a via a SUBSCRIBE message. Here, the login information is transferred to the IM server 24 while being contained in a message-body of the SUBSCRIBE message. The following is an example of the message-body.

LOG: ACT=ON, UID=YangDB@imptt.com, DATA=********;

Here, the ACT field represents the login operation, the UID field includes the user identification and the DATA field includes the password.

At step e), in order to confirm that the SUBSCRIBE message has been normally received, the IM server 24 transfers an SIP message with a status-line of "200 OK" to the SIP server 22. Then, at step f), in order to confirm that the login request has been normally received, the SIP server 22 transmits a "200 OK" message to the terminal 10a.

At step g), with the user identification and the password, the IM server 24 reads information of a corresponding subscriber profile from a database, and then performs the login procedure. Then, the IM server 24 notifies the SIP server 22 of the login procedure's result via an SIP message that has a request-line of "NOTIFY". The following is an example of a message-body of this NOTIFY message.

LOG: RESULT=OK;

At step h), the SIP server 22 transfers the NOTIFY result received from the IM server 24 to the terminal 10a. Then, at step i), in order to confirm that the NOTIFY result has been received, the terminal 10a transmits a "200 OK" message to the SIP server 22, and at step j), the SIP server 22 transfers the 200 OK message to the IM server 24. The terminal 10a then informs the user of having logged in to the instant messaging service.

Figure 5:
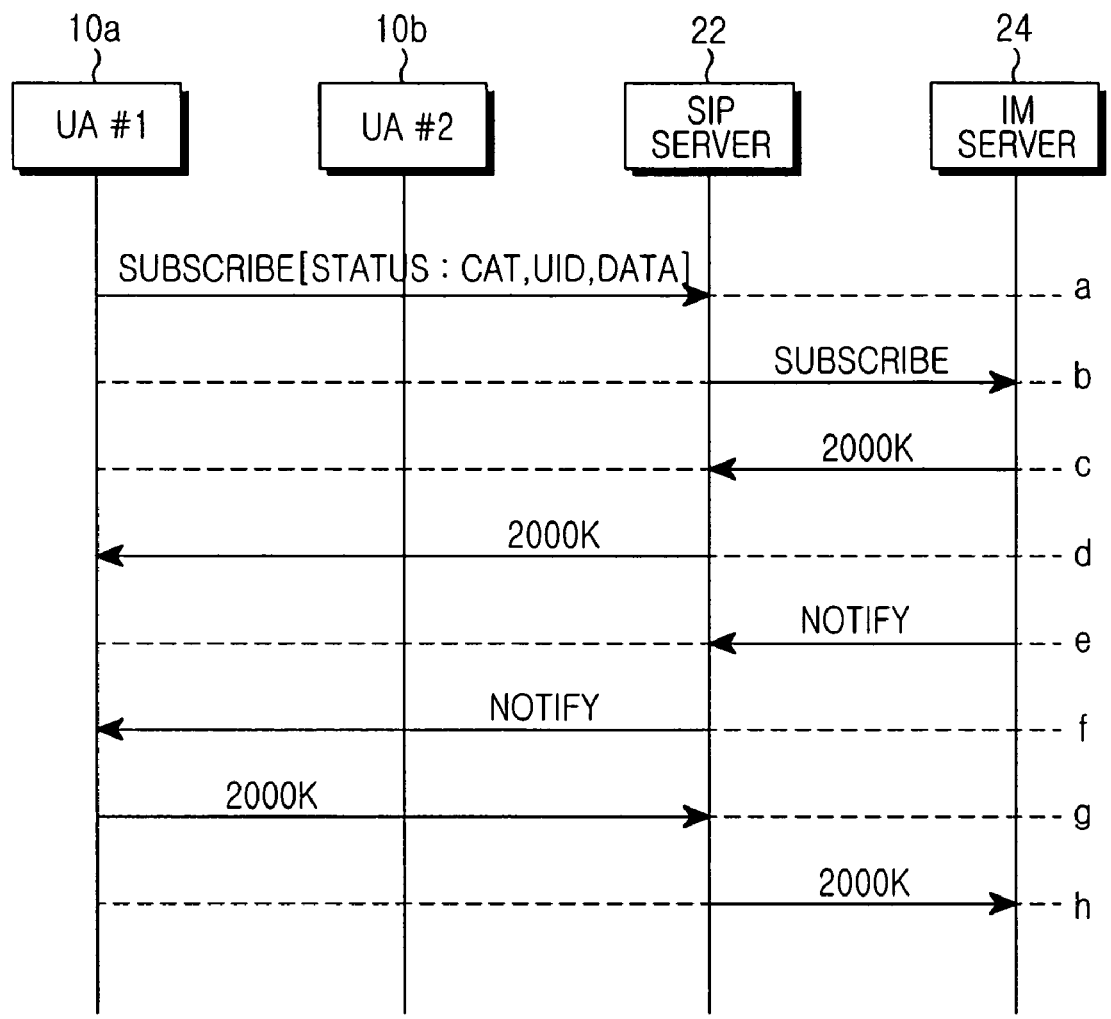
FIG. 5 is a message flow diagram illustrating a user status request operation for requesting the status of an instant messaging service user according to an embodiment of the present invention.

FIG. 5 is a message flow diagram illustrating a user status request operation for requesting the status of an instant messaging service user according to an embodiment of the present invention.

As shown in this figure, at step a), an terminal (UA#1) 10a transmits a SUBSCRIBE message to an SIP server 22 in order to check the status of a single recipient selected or the states of recipients of a single group selected according to the user's request. The SUBSCRIBE message contains information of the single recipient or group whose status the user desires to check. At step b), the SIP server 22 notifies an IM server 24 of the information received from the terminal 10a via the SUBSCRIBE message. The following is an example of the message-body of the SUBSCRIBE message.

STATUS: CAT=ONE(or GROUP), UID=YangDB@imptt.com DATA=tiger@imptt.com(or GRP0001);

This example is used when a user "YangDB@imptt.com" desires to check the status of a recipient "tiger@imptt.com" or the states of recipients of a group "GRP0001".

At step c), the IM server 24 transfers a 200 OK message to the SIP server 22 in order to confirm that the SUBSCRIBE message has been normally received, and at step d), the SIP server 22 transfers a 200 OK message to the terminal 10a.

At step e), the IM server 24 checks status information of the requested recipients, and notifies the SIP server 22 of the checked result via a NOTIFY message. The following is an example of a message-body of the NOTIFY message.

STATUS: RESULT=OK, CAT=ONE, DATA=tiger@imptt.com:ON;

This example shows that the status of a recipient "tiger@imptt.com" is online. In the case where the status request is made for one group, the CAT field is set to GROUP, and the DATA field includes all the states of recipients of the requested group. The following is an example of a message-body of the NOTIFY message for responding to the status request for one group, in which recipients of the group are divided by "|".

STATUS: RESULT=OK, CAT=GROUP, DATA=tiger@imptt.com:ON|lion@imptt.com:AB-S_MEAL;

At step f), the SIP server 22 transfers the information received from the IM server 24 to the terminal 10*a* via a NOTIFY message. Then, at step g), the terminal 10*a* transfers a 200 OK message to the SIP server 22 in order to confirm that it has received a NOTIFY method via the NOTIFY message, and at step h), the SIP server 22 transfers a 200 OK message to the IM server 24. The terminal 10*a* then displays the status of the recipient selected or the states of recipients of the group selected according to the user's request, so as to inform the user thereof.

Figure 6:
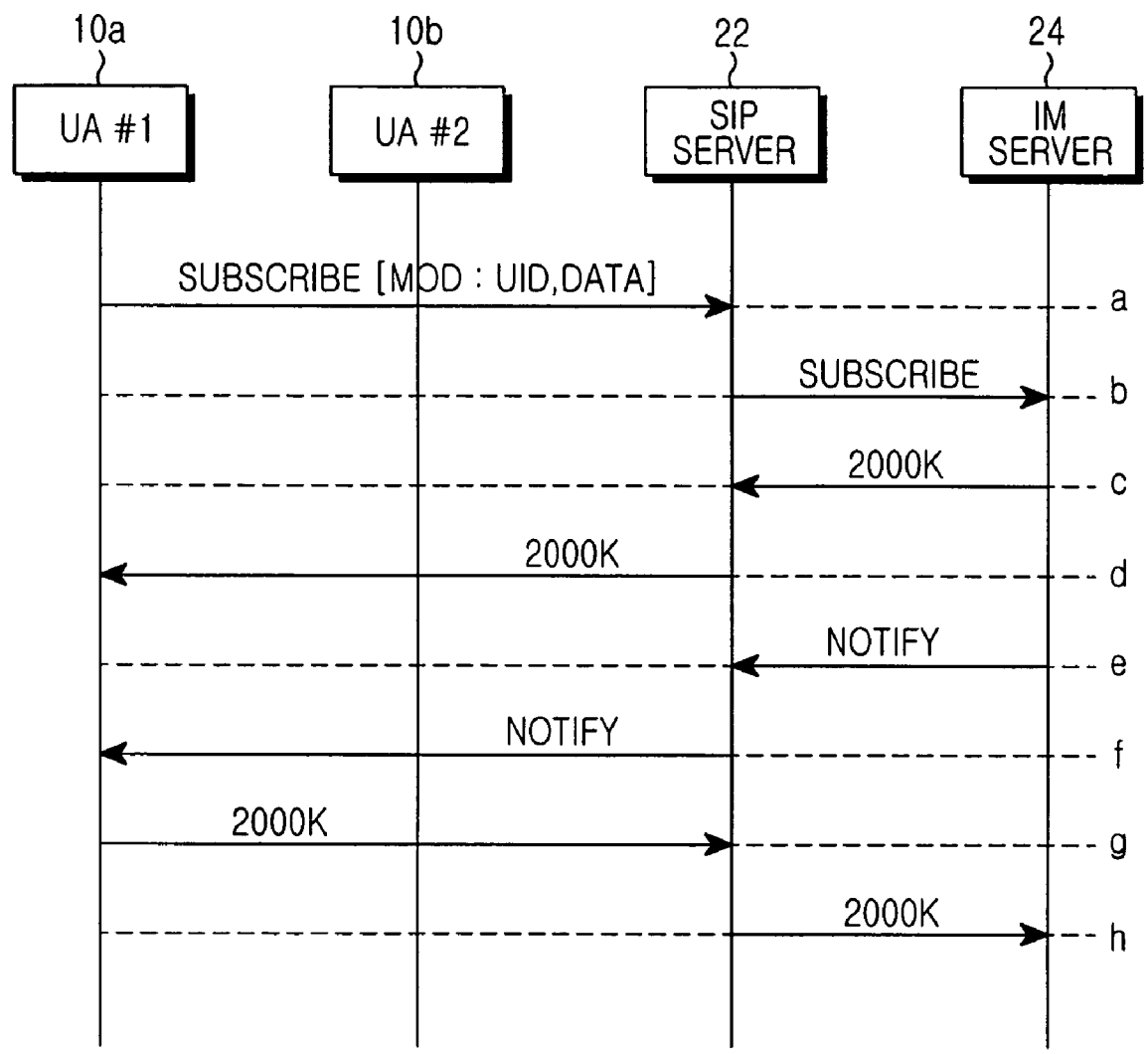
FIG. 6 is a message flow diagram illustrating an operation for changing the receiving mode of an instant messaging service user according to an embodiment of the present invention.

FIG. 6 is a message flow diagram illustrating an operation for changing the receiving mode of an instant messaging service user according to an embodiment of the present invention.

As shown in this figure, at step a), a terminal 10*a* connects to the Internet and transmits a SUBSCRIBE message for changing the terminal's receiving mode to the SIP server 22. The SUBSCRIBE message contains information indicating a new receiving mode to which the terminal's user desires to change the existing mode. At step b), the SIP server 22 notifies an IM server 24 of the information received from the terminal 10*a* via a SUBSCRIBE message. The following is an example of a message-body of the SUBSCRIBE message.

MODE: UID=YangDB@imptt.com, DATA=10;

In this example, a user of YangDB@imptt.com requests that reception of person-to-person messages be allowed and reception of group messages be denied.

At step c), the IM server 24 transfers a 200 OK message, confirming that it has normally received the SUBSCRIBE message, to the SIP server 22, and at step d), the SIP server 22 transfers a 200 OK message to the terminal 10*a*.

At step e), the IM server 24 changes the user's receiving mode to a new mode requested by the SUBSCRIBE message, and notifies the SIP server 22 of the changed result via a NOTIFY message. The following is an example of a message-body of the NOTIFY message.

MODE: RESULT=OK;

At step f), the SIP server 22 transfers the changed result received from the IM server 24 to the terminal 10*a* via a NOTIFY message. Then, at step g), the terminal 10*a* transmits a 200 OK message, confirming that it has normally received a NOTIFY method via the NOTIFY message, to the SIP server 22, and at step h), the SIP server 22 transfers a 200 OK message to the IM server 24. Then, the terminal 10*a* notifies the user that the receiving mode has been normally changed (not shown).

Figure 7:
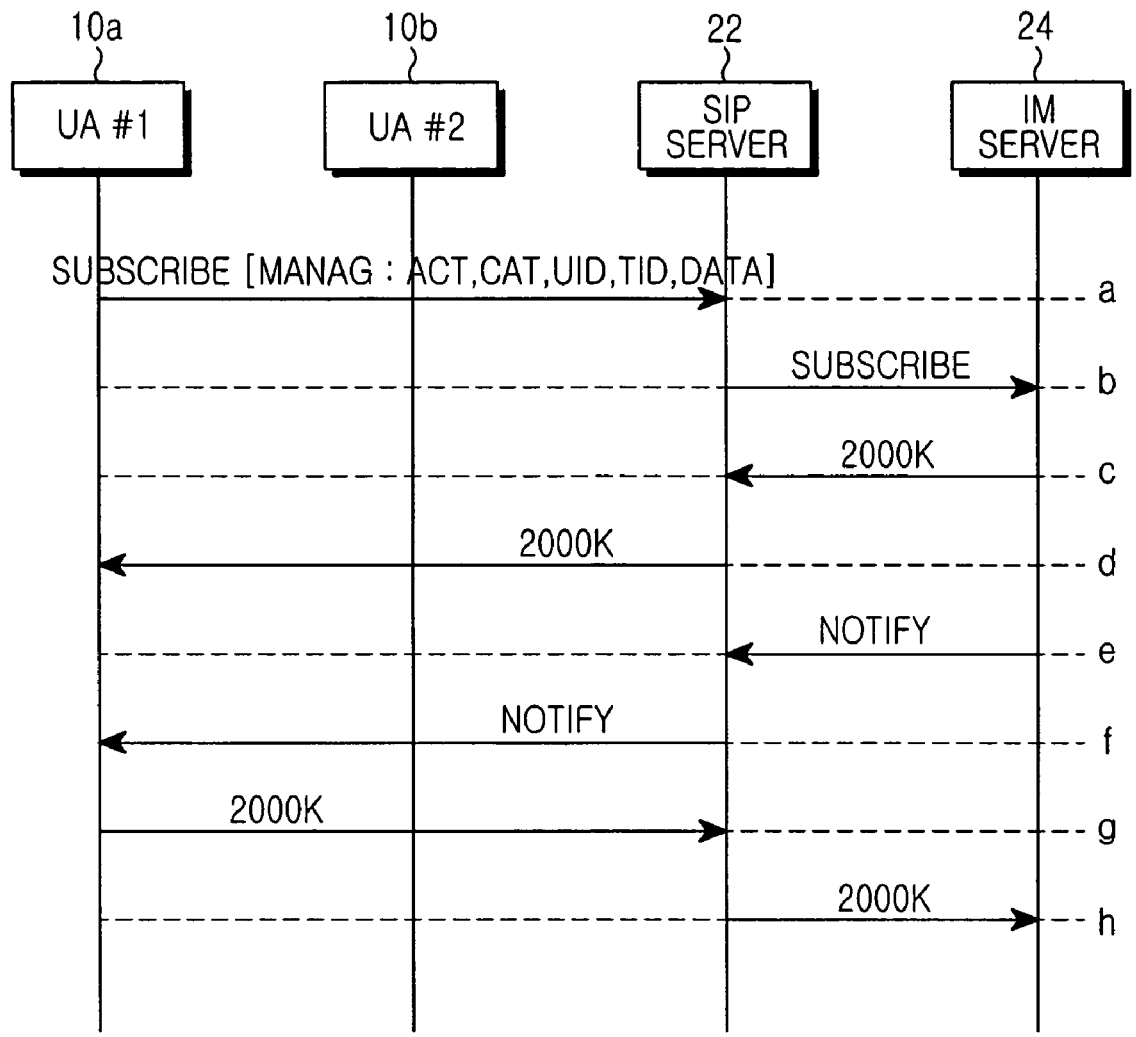
FIG. 7 is a message flow diagram illustrating an operation for managing the recipient information of an instant messaging service user according to an embodiment of the present invention.

FIG. 7 is a message flow diagram illustrating an operation for managing the recipient information of an instant messaging service user according to an embodiment of the present invention.

As shown in this figure, at step a), a terminal 10*a* transmits a SUBSCRIBE message for modifying a message recipient list managed by the terminal's user to an SIP server 22. In order to modify the message recipient list, this SUBSCRIBE message contains information of a recipient or group the user desires to delete or add from or to the message recipient list. At step b), the SIP server 22 transfers the information received from the terminal 10*a* to an IM server 24 via a SUBSCRIBE message. The following is an example of a message-body of the SUBSCRIBE message transmitted to the IM server 24.

MANAGEMENT: ACT=ADD, CAT=ONE, UID=YangDB@imptt.com, TID=schoolmate, DATA=lion@imptt.com;

In this example, a user "YangDB@imptt.com" requests that a recipient "lion@imptt.com" be added to a group "schoolmate" in the user's message recipient list.

At step c), the IM server 24 transfers a 200 OK message, confirming that it has normally received a SUBSCRIBE method included in the SUBSCRIBE message, to the SIP server 22. At step d), the SIP server 22 transfers a 200 OK message, confirming that the SUBSCRIBE method has been normally received, to the terminal 10*a*.

At step e), the IM server 24 adds or deletes the recipient or group as requested by the terminal 10*a*, and notifies the SIP server 22 of the result via a NOTIFY message. The following is an example of a message-body of the NOTIFY message.

MANAGEMENT: RESULT=OK;

At step f), the SIP server transfers the information received from the IM server 24 to the terminal 10*a* via a NOTIFY method included in the NOTIFY message. Then, at step g), the terminal 10*a* transfers a 200 OK message, confirming that it has normally received the NOTIFY method, to the SIP server 22, and at step h), the SIP server 22 transfers a method 200 OK message to the IM server 24. The terminal 10*a* then displays information indicating that the message recipient list has been normally modified (not shown).

Figure 8:
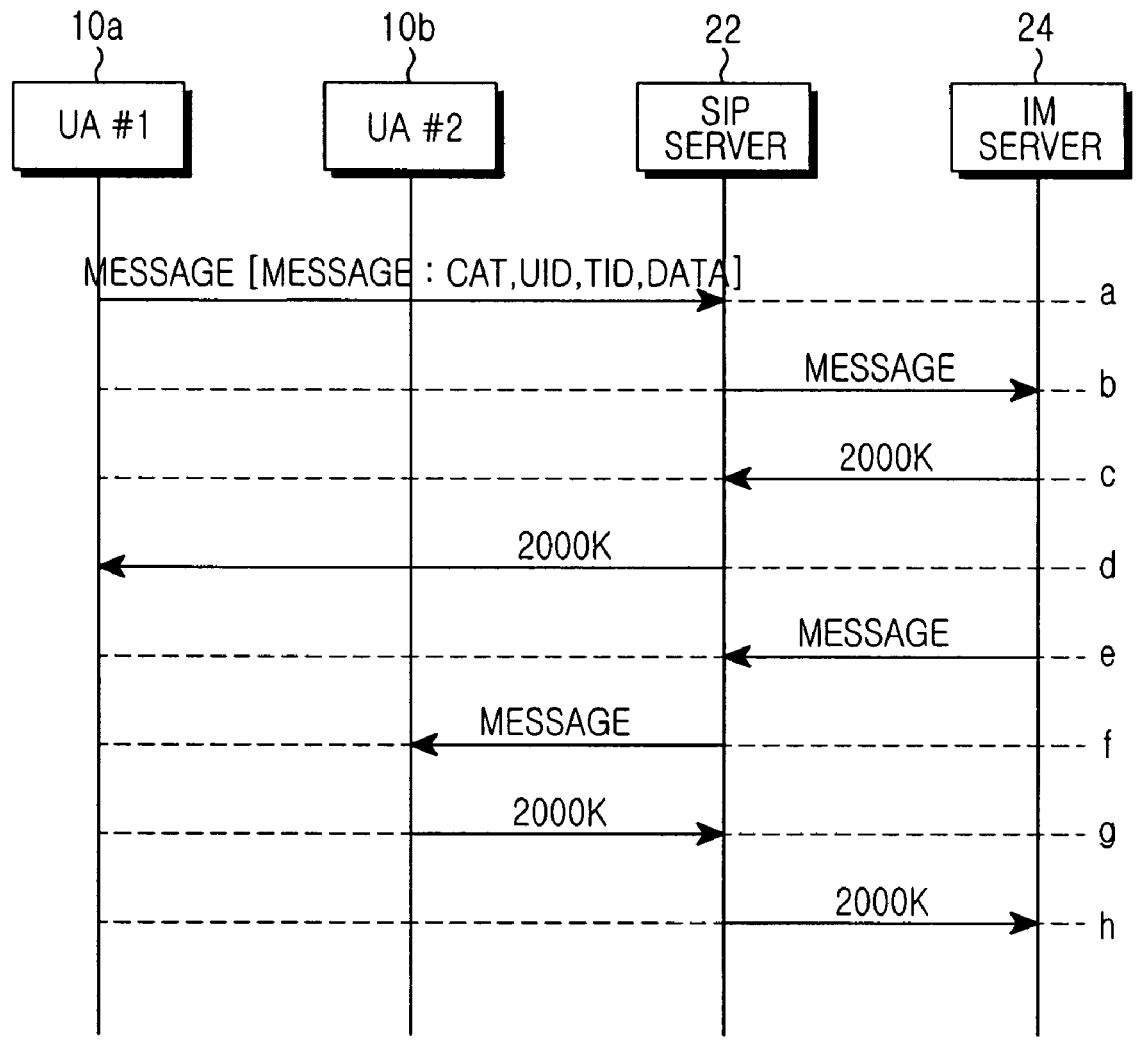
FIG. 8 is a message flow diagram illustrating an operation for transmitting a message of an instant messaging service user according to an embodiment of the present invention.

FIG. 8 is a message flow diagram illustrating an operation for transmitting a message of an instant messaging service user according to an embodiment of the present invention.

As shown in this figure, at step a), a transmitting terminal (UA#1) 10*a* transmits an SIP message (hereinafter, also referred to as a "transmission message") to an SIP server 22. This transmission message contains content "MESSAGE" in its start-line and contains content for transmission (for example, "hello"), input by the terminal's user, in its message-body. At step b), the SIP server 22 transfers a transmission message, containing the information received from the transmitting terminal 10*a*, to an IM server 24. The following is an example of the message-body of the transmission message transmitted to the IM server 24.

MESSAGE: CAT=ONE, UID-YangDB@imptt.com, TID=lion@imptt.com, DATA=hello

In this example, a user "YangDB@imptt.com" sends a message "hello" (hereinafter, also referred to as "transmission content") to a recipient "lion@imptt.com".

At step c), the IM server 24 transmits a 200 OK message, confirming that it has normally received the transmission message, to the SIP server 22, and at step d), the SIP server 22 transfers a 200 OK message to the terminal 10*a*.

At step e), in order to transmit the transmission content to a receiving terminal UA#2 10*b*, the IM server 24 transmits the transmission content to the SIP server 22 via a transmission message that contains the transmission content and a user identification and a nickname of the transmitting terminal 10*a*. Then, at step f), the SIP server 22 transfers the transmission content received from the IM server 24 to the receiving terminal 10*b* via a transmission message.

At step g), the receiving terminal 10*b* transmits a 200 OK message, confirming that it has normally received the transmission message, to the SIP server 22, and at step h), the SIP server 22 a 200 OK message to the IM server 24. Then, the receiving terminal 10*b* displays the transmission content sent by the transmitting terminal 10a in the format of "UA1: hello". Here, "UA1" is the nickname of the transmitting terminal 10a.

Figure 9:
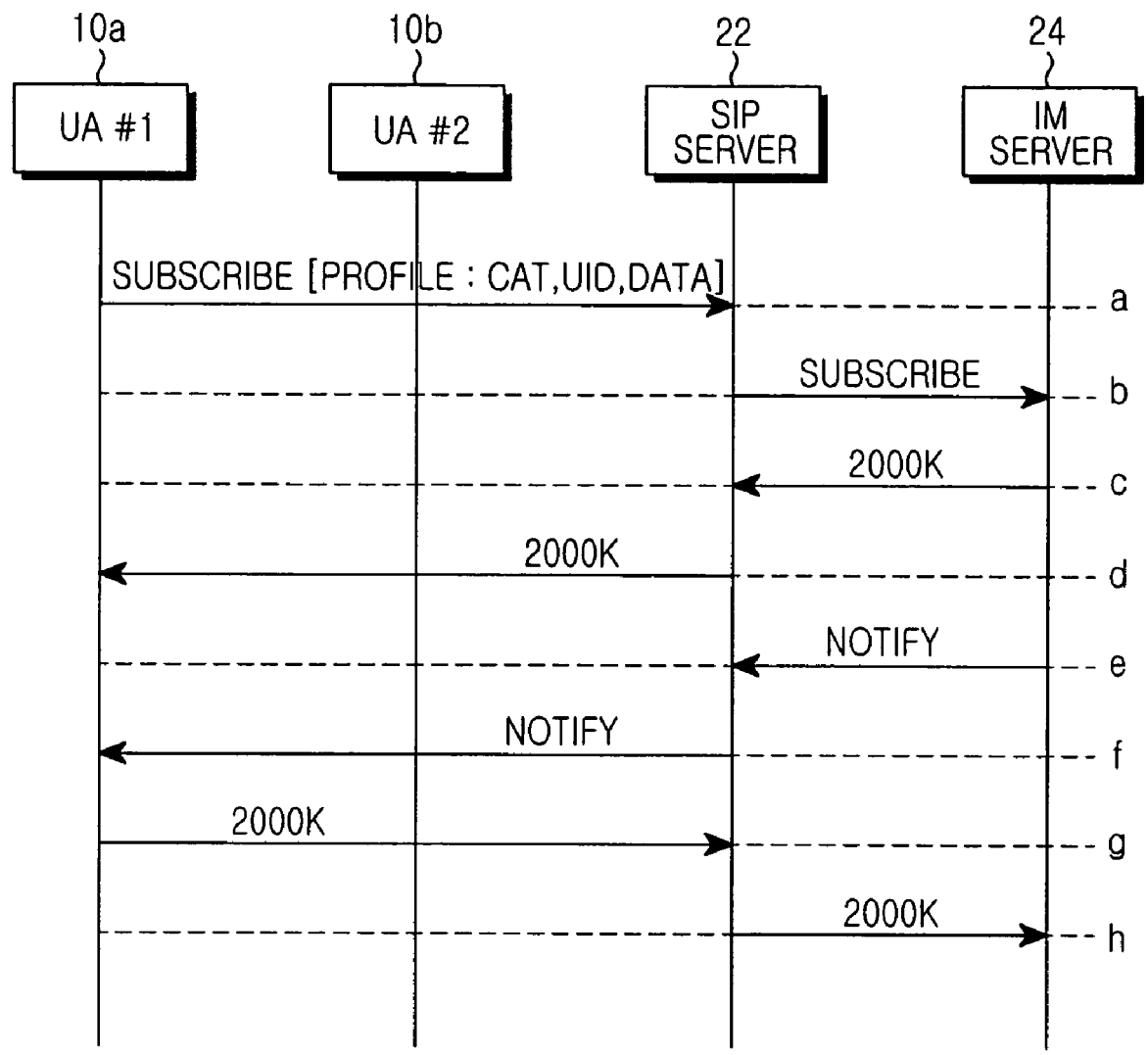
FIG. 9 is a message flow diagram illustrating an operation of managing the subscriber information of an instant messaging service user according to an embodiment of the present invention.

FIG. 9 is a message flow diagram illustrating an operation of managing the subscriber information of an instant messaging service user according to an embodiment of the present invention.

As shown in this figure, at step a), a terminal 10a transmits a SUBSCRIBE message, which contains new subscriber information inputted by the terminal's user, to a SIP server 22 in order to change the status, nickname, password, and the like of the terminal's user. At step b), the SIP server 22 notifies an IM server 24 of the change information received from the terminal 10a via a SUBSCRIBE message. The following is an example of the message-body of the SUBSCRIBE message transferred to the IM server 24.

PROFILE: CAT=PASSWORD, UID=tiger@samsung.com, DATA=********;

In this example, a user "tiger@samsung.com" requests to change the user's login password.

Then, at step c), the IM server 24 transfers a 200 OK message, which is a confirm method for confirming that it has received a SUBSCRIBE method included in the SUBSCRIBE message, to the SIP server 22. At step d), the SIP server 22 transfers a 200 OK message, which is a confirm method for confirming that the SUBSCRIBE message has been normally received, to the terminal 10a.

At step e), the IM server 24 processes the subscriber information change requested by the terminal 10a, and transmits the processed result to the SIP server 22 via a NOTIFY message. The following is an example of the message-body of the NOTIFY message.

PROFILE: RESULT=OK;

At step f), the SIP server 22 transfers a NOTIFY message, which contains the changed result of the subscriber information received from the IM server 24, to the terminal 10a. Then, at step g), the terminal 10a transmits a 200 OK message, confirming that it has normally received the NOTIFY message, to the SIP server 22, and at step h), the SIP server 22 transfers a 200 OK message to the IM server 24. Thereafter, the terminal 10a displays information indicating that the subscriber information change has been normally processed.

The following is a brief description of the advantages of the present invention, which can be achieved by typical examples of the embodiments of the present invention that operate in the same or similar manner as described above.

That is, an additional call control according to the Internet protocol in a system is performed, which makes it possible for a user connected to the Internet via a mobile communication network to communicate instant messages with selected buddies or colleagues.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but defined by the accompanying claims as well as equivalents thereof.

What is claimed is:

1. A method for providing an instant messaging service in a Session Initiation Protocol (SIP) server of a mobile communication system, said system including the mobile terminals, an instant messaging service (IM) server and the SIP server, the method comprising the steps of:

receiving a Session Initiation Protocol (SIP) message according to a requesting type for an instant messaging service from a mobile terminal, wherein the Session Initiation Protocol (SIP) message includes a message-body including at least one of a FUNCTION field indicating a function of the SIP message, an action (ACT) field indicating an operation of the indicated function, a category (CAT) field indicating a range in which the indicated operation is performed, a user identification (UID) field indicating a sender of the SIP message, a target user identification (TID) field indicating a target user for the indicated operation, a DATA field containing data according to the indicated function, and a RESULT field containing a result of a request; and transmitting the Session Initiation Protocol (SIP) message to the IM server.

2. The method according to claim 1, wherein the requesting type is one of a User login/logout, a User status request, a receiving mode change request, a recipient information request, a message transmission, and a change of subscriber information.

3. The method according to claim 1, further comprising the steps of:

receiving a Notify message from the IM server in response to the SIP message transmitted to the IM server; and transmitting the received Notify message to the mobile terminal.

4. The method according to claim 1, wherein said Session Initiation Protocol (SIP) message for the instant messaging service is one of a message for registration, a message for login/logout of a user, a message for requesting a user status, a message for changing a receiving mode, a message for managing recipient information, and a text message for transmission.

5. The method according to claim 1, wherein said Session Initiation Protocol (SIP) message for the instant messaging service indicates at least one of an instruction word, a message for transmission and a processed result.

6. The method according to claim 1, wherein the FUNCTION field indicates one of a log function to request login or logout of a user for an instant messaging service, a status function to inquire of a status of a recipient selected from a message recipient list, a mode function to set a receiving mode for a user, a management function to manage a recipient or group selected from the message recipient list, a message function to transmit a message for transmission to a recipient or group selected from the message recipient list, and a profile function to change subscriber information of a user.

7. A method for providing an instant messaging service in a Session Initiation Protocol (SIP) server of a mobile communication system, said system including the mobile terminals, an instant messaging service (IM) server and the SIP server, the method comprising the steps of:

receiving a Session initiation Protocol (SIP) message according to a requesting type for an instant messaging service from a mobile terminal, wherein the SIP message includes a FUNCTION field representing a message function, a CAT field indicating whether said selected at least one recipient is a recipient or recipients of a group, a UID field including a user identification of the mobile terminal, a TID field including a user identification or a group name of said at least one recipient, and a data field including said message for transmission;

transmitting the Session Initiation Protocol (SIP) message to the IM server;
receiving a response message for the SIP message from the IM server; and
transmitting the message for transmission extracted from the response message for the SIP message in the IM server to a recipient currently connected to the Internet from among said selected at least one recipient.

8. The method according to claim 7, wherein the extracted message for transmission is included in the SIP message so that the extracted instant message is transmitted to a recipient currently connected to the Internet from among said selected at least one recipient via the SIP server.

9. The method according to claim 7, further includes the step of:
if the message for transmission fails to be normally transmitted to one recipient from among said selected at least one recipient transmitting a SIP response message, including a reason why the message for transmission failed to be transmitted, to the mobile terminal via the SIP server.

10. A method for providing an instant messaging service in a Session Initiation Protocol (SIP) server of a mobile communication system, said system including the mobile terminals, an instant messaging service (IM) server and the SIP server, the method comprising the steps of:
receiving a SIP request message including a user identification and a password from the mobile terminal in order to log in to an instant messaging service, wherein the SIP request message includes a message-body including a FUNCTION field representing a log function, an ACT field indicating that the SIP request message is to log in to the instant messaging service, a UID field including the user identification of the mobile terminal, and a DATA field including the password;
transferring the SIP request message to the IM server;
receiving a SIP response message including a result of authentication of the user identification and password, said authentication being performed by analyzing the SIP request message in the IM server; and
transmitting the received SIP response message to the mobile terminal.

11. A method for providing an instant messaging service in a Session Initiation Protocol (SIP) server of a mobile communication system, said system including the mobile terminals, an instant messaging service (IM) server and the SIP server, the method comprising the steps of:
receiving a SIP request message for logging out of the instant messaging service from the mobile terminal, wherein the SIP request message includes a message-body including a FUNCTION field representing a log function, an ACT field indicating that the SIP request message is to log out of the instant messaging service, and a UID field including a user identification of the mobile terminal;
transferring the SIP request message to the IM server;
receiving a SIP response message including a result of a logout process of the mobile terminal, said logout process being performed by analyzing the SIP request message in the IM server; and
transmitting the received SIP response message to the mobile terminal.

12. A method for providing an instant messaging service in a Session Initiation Protocol (SIP) server of a mobile communication system, said system including the mobile terminals, an instant messaging service (IM) server and the SIP server, the method comprising the steps of:
receiving a SIP request message from the mobile terminal, said SIP request message being a message for inquiring on a status of at least one recipient selected from a message recipient list including at least one recipient, wherein the SIP request message includes a message-body including a FUNCTION field representing a status function, a CAT field indicating whether the SIP request message is to inquire of a status of a selected recipient or respective states of recipients of a selected group, a UID field including a user identification of the mobile terminal, and a DATA field including a user identification of a user to be subjected to the inquiry or a name of a group to be subjected to the inquiry;
transferring the SIP request message to the IM server;
receiving a SIP response message including at least one confirmed status of said selected at least one recipient, said status being confirmed by analyzing the SIP request message in the IM server; and
transmitting the received SIP response message to the mobile terminal.

13. A method for providing an instant messaging service in Session Initiation Protocol (SIP) server of a mobile communication system, said system including the mobile terminals, an instant messaging service (IM) server and the SIP server, the method comprising the steps of:
receiving a SIP request message for setting a receiving mode of the mobile terminal from the mobile terminal, wherein the SIP request message includes a message-body including a FUNCTION field representing a mode function, a UID field including a user identification of the mobile terminal, and a DATA field indicating that the mobile terminal allows or denies reception of a person-to-person message or a group message;
transferring the SIP request message to the IM server;
receiving a SIP response message including a result of change of the receiving mode, said change being performed by analyzing the SIP request message in the IM server; and
transmitting the received SIP response message to the mobile terminal.

14. A method for providing an instant messaging service in a Session Initiation Protocol (SIP) server of a mobile communication system, said system including the mobile terminals, an instant messaging service (IM) server and the SIP server, the method comprising the steps of:
receiving a SIP request message for managing a message recipient list including at least one recipient from the mobile terminal, wherein the SIP request message includes a message-body including a FUNCTION field representing a management function, an ACT field indicating that the change of the message recipient list is one of addition, deletion, generation and modification, a CAT field indicating whether the change's target is a user or a group, a UID field including a user identification of the mobile terminal, a TID field representing a target for which the change is performed, and a DATA field representing content to be subjected to the change;
transferring the SIP request message to the IM server;
receiving a SIP response message including a result of change of the message recipient list, said change being performed by analyzing the SIP request message in the IM server; and
transmitting the received SIP response message to the mobile terminal.

15. A method for providing an instant messaging service in a Session Initiation Protocol (SIP) server of a mobile communication system, said system including the mobile terminals, an instant messaging service (IM) server and the SIP server, the method comprising the steps of:

receiving a SIP request message for changing subscriber information of the mobile terminal from the mobile terminal, wherein the SIP request message includes a message-body including a FUNCTION field representing a profile function, a CAT field representing subscriber information to be changed, a UID field including a user identification of the mobile terminal, and a DATA field representing content of the subscriber information to be subjected to the change;

transferring the SIP request message to the IM server;

receiving a SIP response message including a result of change of the subscriber information of the mobile terminal, said change being performed by analyzing the SIP request message in the IM server; and transmitting the received SIP response message to the mobile terminal.

16. An apparatus for providing an instant messaging service in a Session Initiation Protocol (SIP) server of a mobile communication system, said system including the mobile terminals, an IM server and the SIP server, the apparatus comprising:

a mobile terminal being capable of connecting to the Internet and enabling the instant messaging service and generating a SIP message according to a requesting type, wherein the SIP message includes a message-body including at least one of a FUNCTION field indicating a function of the SIP message, an ACT field indicating an operation of the indicated function, a CAT field indicating a range in which the indicated operation is performed, a UID field indicating a sender of the SIP message, a TID field indicating a target user to be subjected to the indicated operation, a DATA field containing data according to the indicated function, and a RESULT field containing a result of a request;

the SIP server for receiving the SIP message according to a requesting type including an instant message from the mobile terminal, generating a SIP message based on the received message of information, and transmitting the generated SIP message to an IM server; and the IM server for receiving a SIP message from the SIP server, said IM server being connected to the Internet to implement an instant messaging function.

17. The apparatus according to claim 16, wherein the SIP server further receives a Notify message from the IM server in response to the SIP message transmitted to the IM server, and transmits the received Notify message to the mobile terminal.

18. The apparatus according to claim 16, wherein said message of information is one of a message for registration, a message for login/logout of a user, a message for requesting a user status, a message for changing a receiving mode, a message for managing recipient information, and a text message for transmission.

19. The apparatus according to claim 16, wherein the FUNCTION field indicates one of a log function to request login or logout of a user for an instant messaging service, a status function to inquire on a status of a recipient selected from a message recipient list, a mode function to set a receiving mode of a user, a management function to manage a recipient or group selected from the message recipient list, a message function to transmit a message for transmission to a recipient or group selected from the message recipient list, and a profile function to change subscriber information of a user.

* * * * *